US008860852B2

(12) United States Patent  (10) Patent No.: US 8,860,852 B2
Koizumi  (45) Date of Patent: Oct. 14, 2014

(54) IMAGE CAPTURING APPARATUS

(75) Inventor: Tatsuro Koizumi, Niiza (JP)

(73) Assignee: Canon Kabushiki Kaisha, Tokyo (JP)

( * ) Notice: Subject to any disclaimer, the term of this patent is extended or adjusted under 35 U.S.C. 154(b) by 201 days.

(21) Appl. No.: 13/411,932

(22) Filed: Mar. 5, 2012

(65) Prior Publication Data

US 2012/0242870 A1  Sep. 27, 2012

(30) Foreign Application Priority Data

Mar. 22, 2011 (JP) ................................ 2011-062928

(51) Int. Cl.
H04N 5/217 (2011.01)
H04N 5/355 (2011.01)
H04N 9/04 (2006.01)
H04N 5/232 (2006.01)
H04N 5/225 (2006.01)

(52) U.S. Cl.
CPC ......... *H04N 5/2258* (2013.01); *H04N 5/35563* (2013.01); *H04N 9/045* (2013.01); *H04N 5/23232* (2013.01)
USPC ....................................................... 348/241

(58) Field of Classification Search
USPC ......... 348/241, 243, 246, 247, 335, 340, 345, 348/348, 350, 352
See application file for complete search history.

(56) References Cited

U.S. PATENT DOCUMENTS 6,529,640 B1  3/2003 Utagawa et al.
8,106,973 B2  1/2012 Kasahara
8,144,927 B2  3/2012 Zuro
2008/0218611 A1  9/2008 Parulski et al.
2011/0115938 A1*  5/2011 Han ............................ 348/222.1
2012/0026333 A1  2/2012 Okuyama

FOREIGN PATENT DOCUMENTS

CN  101534384 A  9/2009
JP  2002-171430 A  6/2002
JP  2009-278577 A  11/2009
WO  2009/097216 A1  8/2009
WO  2011/013642 A1  2/2011

OTHER PUBLICATIONS

S. Tominaga, "Spectral imaging by a multi-channel camera", Journal of Electronic Imaging, vol. 8, No. 4, pp. 332-341, Oct. 1999.
P. Debevec et al., "Recovering high dynamic range radiance maps from photographs", ACM SIGGRAPH 2008 classes, Aug. 11-15, 2008.
C. Harris et al., "A combined corner and edge detector", Proceedings of the 4th Alvey Vision Conference, pp. 147-151, 1988.
U.S. Appl. No. 13/439,138, filed Apr. 4, 2012, Tatsuro Koizumi.
Jul. 31, 2014 Chinese Office Action concerning corresponding Chinese Patent Application No. 201210078223.0.

* cited by examiner

*Primary Examiner* — Yogesh Aggarwal
(74) *Attorney, Agent, or Firm* — Fitzpatrick, Cella, Harper & Scinto

(57) ABSTRACT

Capturing units acquire, from an object, image data having characteristics different from each other. An image generator calculates a deviation amount indicating the position deviation between images represented by the image data acquired by the capturing units, and generates image data of a multi-channel image in which the position deviation between the images represented by the image data acquired by the capturing units has been corrected using the deviation amount. Each of the capturing units comprises capturing elements having capturing characteristics specific to the capturing unit, and capturing elements having capturing characteristics common to a plurality of capturing units. The image generator calculates the deviation amount from image data acquired by the capturing elements having the common capturing characteristics.

9 Claims, 14 Drawing Sheets

| Y | Cn | Y | Cn | Y | Cn | Y | Cn | Y | Cn | Y | Cn |
|---|---|---|---|---|---|---|---|---|---|---|---|
| Cn | Y | Cn | Y | Cn | Y | Cn | Y | Cn | Y | Cn | Y |
| Y | Cn | Y | Cn | Y | Cn | Y | Cn | Y | Cn | Y | Cn |
| Cn | Y | Cn | Y | Cn | Y | Cn | Y | Cn | Y | Cn | Y |
| Y | Cn | Y | Cn | Y | Cn | Y | Cn | Y | Cn | Y | Cn |
| Cn | Y | Cn | Y | Cn | Y | Cn | Y | Cn | Y | Cn | Y |
| Y | Cn | Y | Cn | Y | Cn | Y | Cn | Y | Cn | Y | Cn |
| Cn | Y | Cn | Y | Cn | Y | Cn | Y | Cn | Y | Cn | Y |
| Y | Cn | Y | Cn | Y | Cn | Y | Cn | Y | Cn | Y | Cn |
| Cn | Y | Cn | Y | Cn | Y | Cn | Y | Cn | Y | Cn | Y |
| Y | Cn | Y | Cn | Y | Cn | Y | Cn | Y | Cn | Y | Cn |
| Cn | Y | Cn | Y | Cn | Y | Cn | Y | Cn | Y | Cn | Y |

FIG. 10

| I(1, 1) |        | I(1, 3) |        | I(1, 5) |
|         | I(2, 2)|        | I(2, 4) |        |
| I(3, 1) |        | I(3, 3) |        | I(3, 5) |
|         | I(4, 2)|        | I(4, 4) |        |
| I(5, 1) |        | I(5, 3) |        | I(5, 5) |

FIG. 12

| Gn | Rn | Gn | Rn | Gn | Rn | Gn | Rn | Gn | Rn | Gn | Rn |
|---|---|---|---|---|---|---|---|---|---|---|---|
| Bn | Y | Bn | Y | Bn | Y | Bn | Y | Bn | Y | Bn | Y |
| Gn | Rn | Gn | Rn | Gn | Rn | Gn | Rn | Gn | Rn | Gn | Rn |
| Bn | Y | Bn | Y | Bn | Y | Bn | Y | Bn | Y | Bn | Y |
| Gn | Rn | Gn | Rn | Gn | Rn | Gn | Rn | Gn | Rn | Gn | Rn |
| Bn | Y | Bn | Y | Bn | Y | Bn | Y | Bn | Y | Bn | Y |
| Gn | Rn | Gn | Rn | Gn | Rn | Gn | Rn | Gn | Rn | Gn | Rn |
| Bn | Y | Bn | Y | Bn | Y | Bn | Y | Bn | Y | Bn | Y |
| Gn | Rn | Gn | Rn | Gn | Rn | Gn | Rn | Gn | Rn | Gn | Rn |
| Bn | Y | Bn | Y | Bn | Y | Bn | Y | Bn | Y | Bn | Y |
| Gn | Rn | Gn | Rn | Gn | Rn | Gn | Rn | Gn | Rn | Gn | Rn |
| Bn | Y | Bn | Y | Bn | Y | Bn | Y | Bn | Y | Bn | Y |

F I G. 13

|   |   |   |   |   |   |   |
|---|---|---|---|---|---|---|
|   |   |   |   |   |   |   |
|   | I(2, 2) |   | I(2, 5) |   | I(2, 7) |   |
|   |   |   |   |   |   |   |
|   | I(4, 2) |   | I(4, 5) |   | I(4, 7) |   |
|   |   |   |   |   |   |   |
|   | I(6, 2) |   | I(6, 5) |   | I(6, 7) |   |
|   |   |   |   |   |   |   |

F I G. 14

| Cm | Cn | Cm | Cn | Cm | Cn | Cm | Cn | Cm | Cn | Cm | Cn |
|----|----|----|----|----|----|----|----|----|----|----|----|
| Cn | Cm | Cn | Cm | Cn | Cm | Cn | Cm | Cn | Cm | Cn | Cm |
| Cm | Cn | Cm | Cn | Cm | Cn | Cm | Cn | Cm | Cn | Cm | Cn |
| Cn | Cm | Cn | Cm | Cn | Cm | Cn | Cm | Cn | Cm | Cn | Cm |
| Cm | Cn | Cm | Cn | Cm | Cn | Cm | Cn | Cm | Cn | Cm | Cn |
| Cn | Cm | Cn | Cm | Cn | Cm | Cn | Cm | Cn | Cm | Cn | Cm |
| Cm | Cn | Cm | Cn | Cm | Cn | Cm | Cn | Cm | Cn | Cm | Cn |
| Cn | Cm | Cn | Cm | Cn | Cm | Cn | Cm | Cn | Cm | Cn | Cm |
| Cm | Cn | Cm | Cn | Cm | Cn | Cm | Cn | Cm | Cn | Cm | Cn |
| Cn | Cm | Cn | Cm | Cn | Cm | Cn | Cm | Cn | Cm | Cn | Cm |
| Cm | Cn | Cm | Cn | Cm | Cn | Cm | Cn | Cm | Cn | Cm | Cn |
| Cn | Cm | Cn | Cm | Cn | Cm | Cn | Cm | Cn | Cm | Cn | Cm |

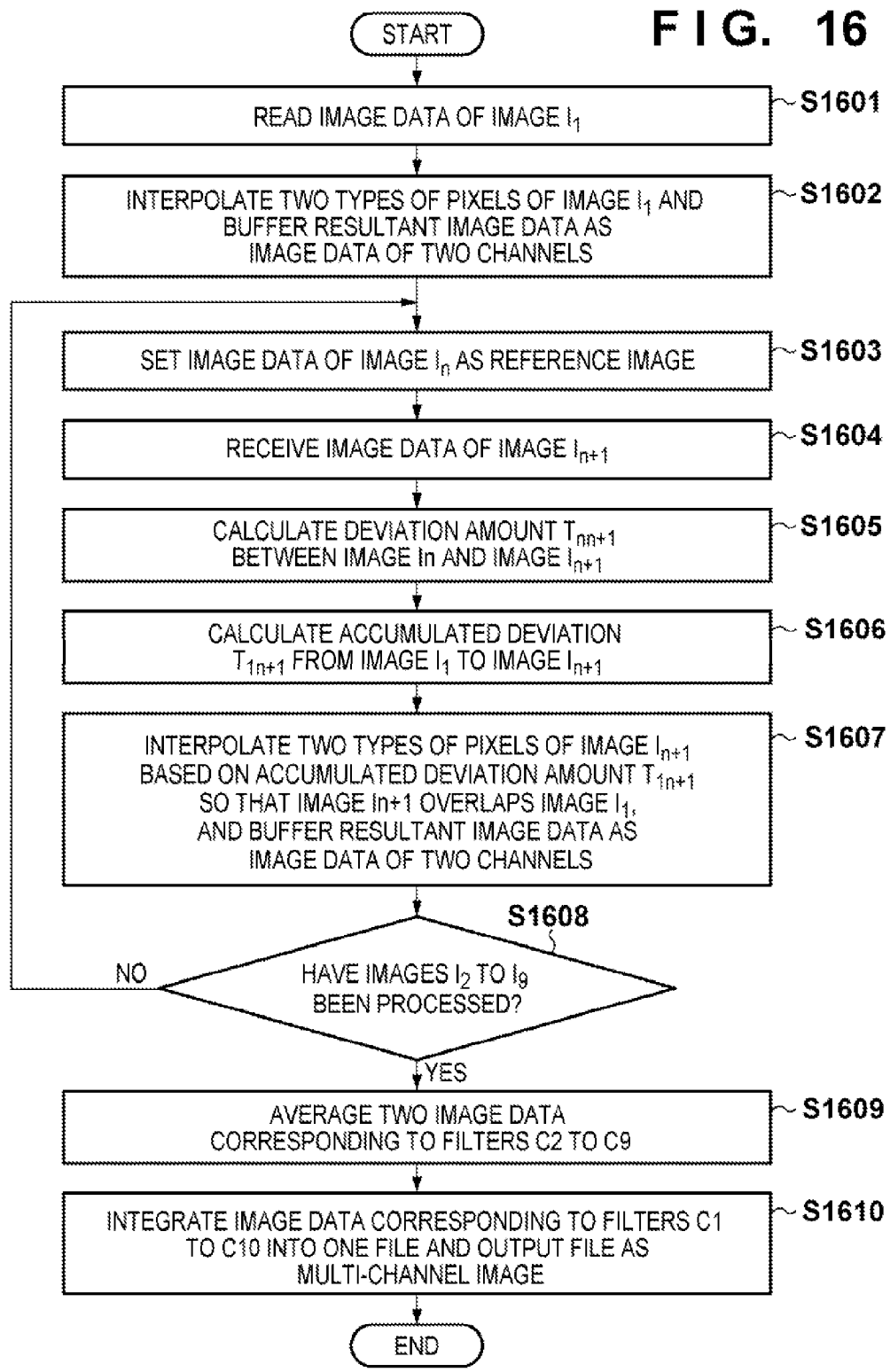

IMAGE CAPTURING APPARATUS

BACKGROUND OF THE INVENTION

1. Field of the Invention

The present invention relates to an image capturing apparatus and, more particularly, to an image capturing apparatus which generates image data of a multi-channel image.

2. Description of the Related Art

A color image capturing apparatus such as a digital camera forms an object image via an imaging optical system on a capturing device having color filters arranged periodically, and generates digital image data by photoelectric conversion and analog-to-digital (AD) conversion. In general, color filters for three, R, G, and B colors are used. The sensitivity characteristic of the capturing device is uniform for all pixels. Color information for an obtained image is limited to these three colors, and even tone information is restricted to a range that is defined by the sensitivity characteristic of the capturing device.

When obtaining an image whose color information and tone information are limited, the user may want to acquire object information more precisely or increase the degree of freedom of adjustment in image editing. For these reasons, a demand has arisen for acquiring an image with larger amounts of color information and tone information.

To meet this demand, there is a technique for acquiring a larger amount of color information by performing shooting using a monochrome camera a plurality of times while switching a plurality of color filters having different spectral transmission characteristics (for example, S. Tominaga, "Spectral imaging by a multi-channel camera", Journal of Electronic Imaging, Vol. 8, No. 4, pp. 332-341, October, 1999). Note that the thus-obtained image having a large amount of color information will be called a multi-band image.

There is also a technique of acquiring information of a dynamic range wider than the limit of a capturing device by performing shooting a plurality of times while changing the exposure (for example, literature 1: Paul E. Debevec et al., "Recovering high dynamic range radiance maps from photographs", ACM SIGGRAPH 2008 classes, Aug. 11-15, 2008). A technique of compositing a plurality of obtained images into one image having a wide dynamic range will be called high dynamic range composition.

However, the above techniques require a plurality of times of shooting operations cumbersomely, and cannot cope with a moving object.

To the contrary, Japanese Patent Laid-Open No. 2009-278577 (literature 2) discloses a technique of preparing cameras for respective colors to be acquired, and after capturing, integrating images captured by these cameras to obtain a color image. This technique requires a plurality of cameras for acquiring color information, but can acquire a multi-band image. Japanese Patent Laid-Open No. 2002-171430 (literature 3) discloses a method of preparing a plurality of cameras different in sensitivity characteristic, and after capturing, performing high dynamic range composition for images captured by these cameras.

The techniques disclosed in literatures 2 and 3 require alignment between images when integrating images captured by a plurality of cameras. However, a plurality of images to be aligned are captured by cameras different in color or sensitivity characteristic, so high alignment accuracy cannot be obtained.

SUMMARY OF THE INVENTION

In one aspect, an image capturing apparatus comprising: a plurality of capturing units which acquire, from an object, image data having characteristics different from each other; a calculator, configured to calculate a deviation amount indicating a position deviation between images represented by the image data acquired by the plurality of capturing units; and a generator, configured to generate image data of a multi-channel image in which the position deviation between the images represented by the image data acquired by the plurality of capturing units has been corrected using the deviation amount, wherein each of the plurality of capturing units comprises a capturing element having capturing characteristics specific to the capturing unit, and a capturing element having capturing characteristics common to the plurality of capturing units, and wherein the calculator calculates the deviation amount from image data acquired by the capturing element having the common capturing characteristics.

According to the aspect, the alignment accuracy between images can be improved when generating image data of a multi-channel image.

Further features of the present invention will become apparent from the following description of exemplary embodiments with reference to the attached drawings.

BRIEF DESCRIPTION OF THE DRAWINGS

FIG. 10 is a view for explaining the arrangement of color pixels.

FIG. 12 is a view for explaining the arrangement of a filter according to the second embodiment.

FIG. 13 is a view showing the array of alignment pixels according to the second embodiment.

FIG. 14 is a view for explaining the arrangement of a filter according to the third embodiment.

FIG. 16 is a flowchart for explaining processing by the image generator.

DESCRIPTION OF THE EMBODIMENTS

Preferred embodiments of an image capturing apparatus according to the present invention will now be described in detail with reference to the accompanying drawings.

[Outline]

Figure 1:
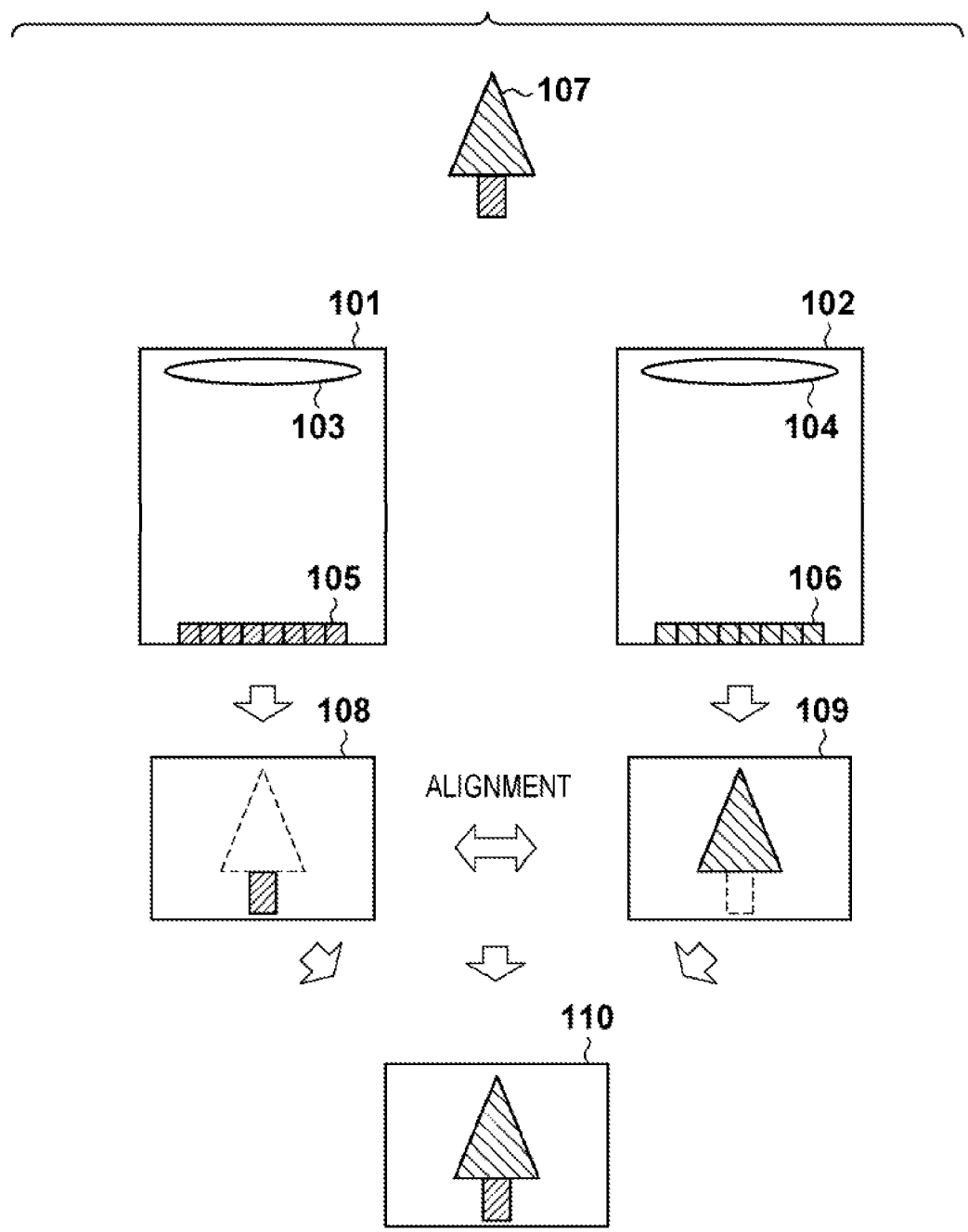
FIG. 1 is a view for explaining a method of compositing images captured by different cameras.

A method of compositing images captured by different cameras will be explained with reference to FIG. 1. FIG. 1 shows an example in which two cameras 101 and 102 are prepared to capture an object 107.

The camera 101 includes an imaging optical system 103 and capturing device 105, and the camera 102 includes an imaging optical system 104 and capturing device 106. The capturing devices 105 and 106 are different in capturing characteristics (color characteristics or sensitivity characteristics) with respect to incident light. Images (to be referred to as channel images) captured by the capturing devices 105 and 106 are superimposed to generate an image.

The camera 101 captures a channel image 108, and the camera 102 captures a channel image 109. These two channel images are aligned. Based on the result, the channel images 108 and 109 are superimposed to generate an image 110.

General alignment assumes that points on images that correspond to the same point of an object have the same pixel value between images to be aligned. However, this assumption is not established for the channel images 108 and 109 because they are acquired by capturing devices having different capturing characteristics. As a result, the alignment accuracy decreases.

Another method of compositing images captured by different cameras will be explained with reference to FIG. 2. Similar to FIG. 1, FIG. 2 shows an example in which two cameras 201 and 202 are prepared to capture an object 207.

The camera 201 includes an imaging optical system 203 and capturing device 205, and the camera 202 includes an imaging optical system 204 and capturing device 206. Unlike the arrangement of FIG. 1, each of the capturing devices 205 and 206 includes two types of capturing elements. One capturing element (to be referred to as a common element) has capturing characteristics common to the capturing devices 205 and 206. The other capturing element (to be referred to as a specific element) has capturing characteristics specific to the capturing device 205 or 206, that is, capturing characteristics in which the color characteristic or sensitivity characteristic with respect to incident light is different. Note that the imaging optical systems 203 and 204 have the same or almost the same optical characteristics.

The cameras 201 and 202 capture images 209 and 210 (to be referred to as common images) using the common elements, and capture channel images 208 and 211 using the specific elements. Alignment is performed using the common images 209 and 210, and the channel images 208 and 211 are superimposed based on the result to generate an image 212. Alignment based on the common images can prevent a decrease in alignment accuracy, and the image 212 can be generated by alignment at high accuracy.

Figure 2:
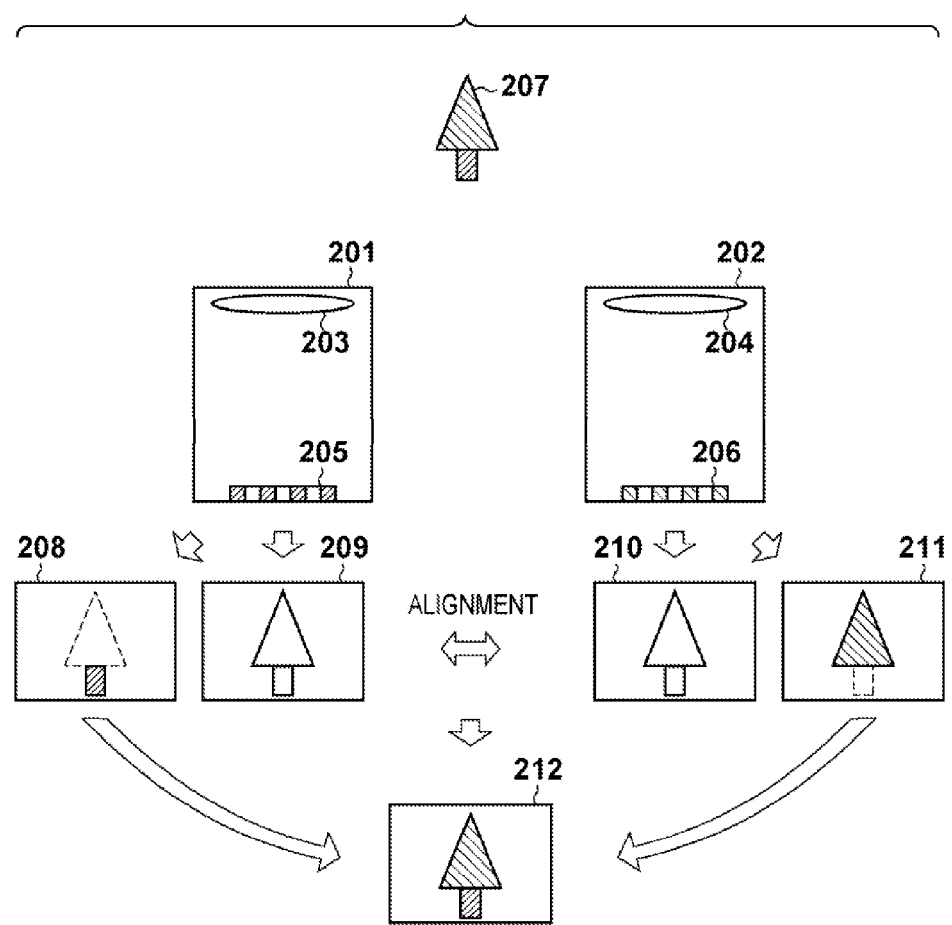
FIG. 2 is a view for explaining another method of compositing images captured by different cameras.

Although examples using two cameras have been explained in FIGS. 1 and 2 for simplicity, a multi-channel image may be captured using a larger number of cameras.

First Embodiment

An example of capturing a multi-channel image will be explained.

[Arrangement of Image Capturing Apparatus]

Figure 3A:
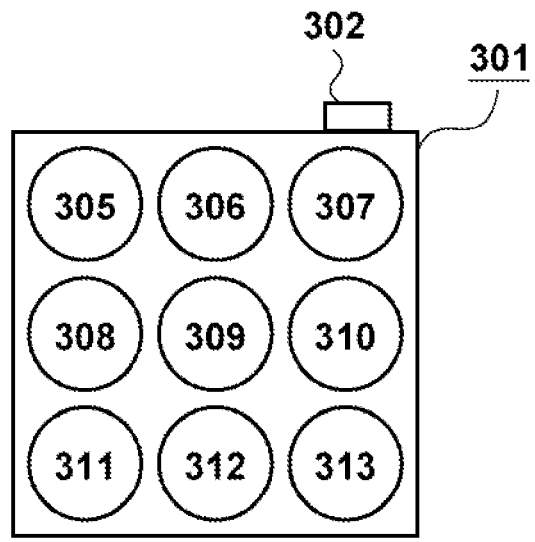
FIGS. 3A and 3B are schematic views for explaining the outer appearance of an image capturing apparatus according to an embodiment.

The outer appearance of an image capturing apparatus according to the embodiment will be described with reference to the schematic views of FIGS. 3A and 3B. FIG. 3A shows the front surface (object side) of a camera body 301, and FIG. 3B shows the rear surface of the camera body 301.

The front surface of the camera body 301 includes a plurality of cameras 305 to 313 (to be referred to as channel cameras) which are arranged in a matrix and correspond to respective channels. The top and rear surfaces of the camera 301 include a shutter button 302, a monitor 303, and an operation unit 304 including buttons and a dial for performing various operations. The user operates the operation unit 304 in accordance with a user interface (UI) displayed on the monitor 303 to set shooting conditions and the like, and presses the shutter button 302 to capture an image. The user can display, on the monitor 303, an image captured by the capturing device, an image captured by each channel camera, an image obtained by compositing channel images, and the like. An image capturing apparatus with a plurality of channel cameras is sometimes called a "multi-eye camera".

Figure 3B:
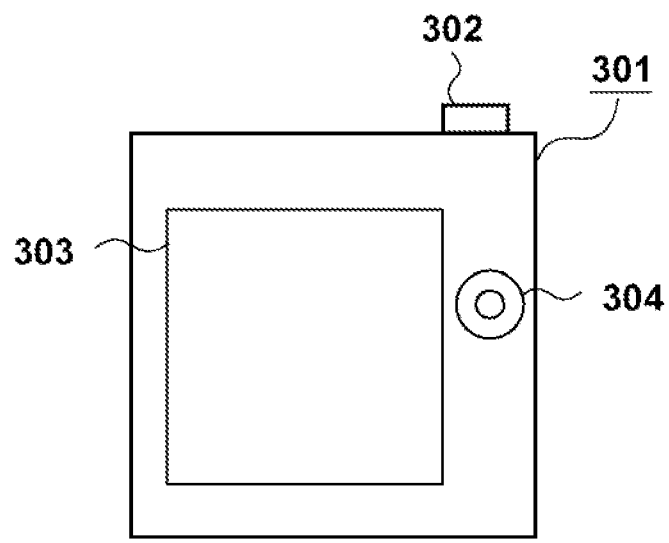

FIGS. 3A and 3B show an example in which a plurality of channel cameras (capturing units) are arranged on the front surface of one image capturing apparatus. However, a plurality of channel cameras may be configured by arranging a plurality of capturing units independent of the image capturing apparatus so as to shoot the same object, and connecting the capturing units to the image capturing apparatus.

Figure 4:
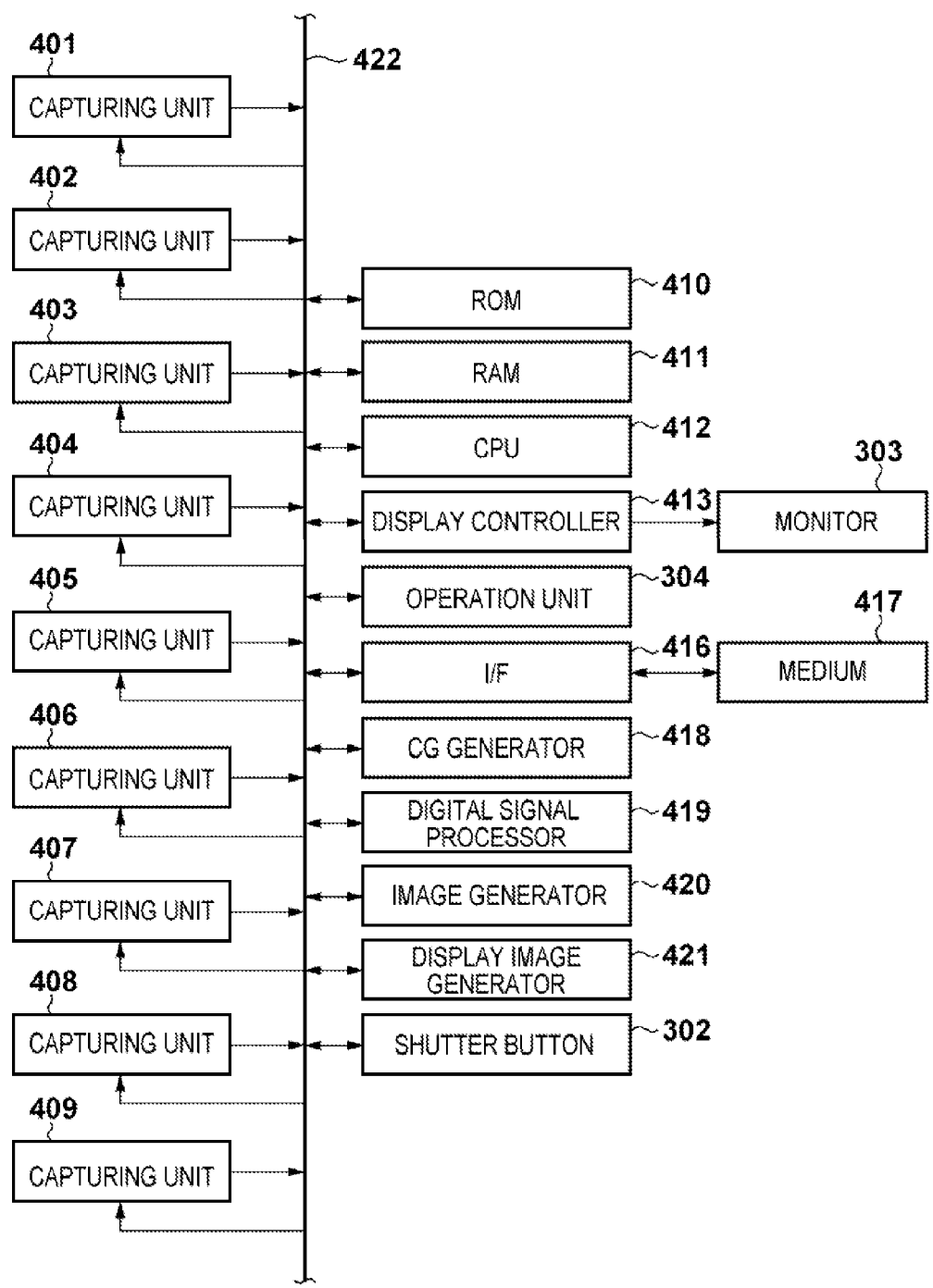
FIG. 4 is a block diagram for explaining the arrangement of the image capturing apparatus according to the embodiment.

The arrangement of the image capturing apparatus according to the embodiment will be explained with reference to the block diagram of FIG. 4. A microprocessor (CPU) 412 uses a random access memory (RAM) 411 as a work memory, executes an operating system (OS) and various programs stored in a read only memory (ROM) 410, and controls respective building components (to be described later) via a system bus 422.

The CPU 412 controls a computer graphics (CG) generator 418 and display controller 413 to display a UI on the monitor 303, and receives user instructions via the operation unit 304 and shutter button 302. In accordance with the user instructions, the CPU 412 performs setting of capturing parameters such as the focal length, f-number, and exposure time in image capturing, image capturing, and display setting of a captured image. Note that the CG generator 418 generates data such as a text and graphics for implementing a UI.

An interface (I/F) 416 has a function for read/write from/on a medium 417 such as a memory card or USB (Universal Serial Bus), and a function of connecting to a wired or wireless computer network. In accordance with an instruction from the CPU 412, the I/F 416 outputs various data stored in, for example, the RAM 411 to an external medium or server apparatus, and receives various data from the external medium or server apparatus.

Capturing units 401 to 409 correspond to the respective capturing units of the channel cameras 305 to 313, details of which will be described later. Each capturing unit includes a capturing device having common and specific elements. The capturing units 401 to 409 capture channel images in accordance with capturing parameters set by the CPU 412 and a capturing instruction from the CPU 412. Image data of the respective channels acquired by capturing are temporarily held in the internal buffers (not shown) of the capturing units 401 to 409, and sequentially stored in a predetermined area of the RAM 411 under the control of the CPU 412. Instead of the RAM 411, the medium 417 connected to the I/F 416 may be utilized as a storage area for image data of the respectively channels.

A digital signal processor 419 performs various signal processes such as noise reduction processing and gamma processing for image data of the channel images captured by the capturing units 401 to 409. An image generator 420 generates a multi-channel image by performing processing (to be referred to as alignment processing) of aligning respective channel images having undergone signal processing by the digital signal processor 419, details of which will be described later.

A display image generator 421 executes processing (to be referred to as display image generation processing) of converting a multi-channel image into a display image displayable on the monitor 303. More specifically, the display image generator 421 performs processes such as gamma processing for the respective channels and conversion from a multi-channel image into R, G, and B images, thereby generating an image displayable on the monitor 303 (observable by the user).

The CPU 412 displays the display image generated by the display image generator 421 on the monitor 303. The user observes the image displayed on the monitor 303, and can determine whether the multi-channel image has been captured properly and whether the conversion parameter is appropriate.

Processes such as gamma processing for the respective channels and conversion from a multi-channel image into R, G, and B images are executed based on the gamma values of the respective channels and the conversion parameter such as a transformation matrix. The conversion parameter is stored in advance in the ROM 410, input from an external medium or server apparatus, or set by the user via a UI. The user can set or adjust (change) the conversion parameter by referring to an image displayed on the monitor 303, and set or adjust the tone of an image generated from a multi-channel image to a desired tone.

[Image Capturing Processing]

Figure 5:
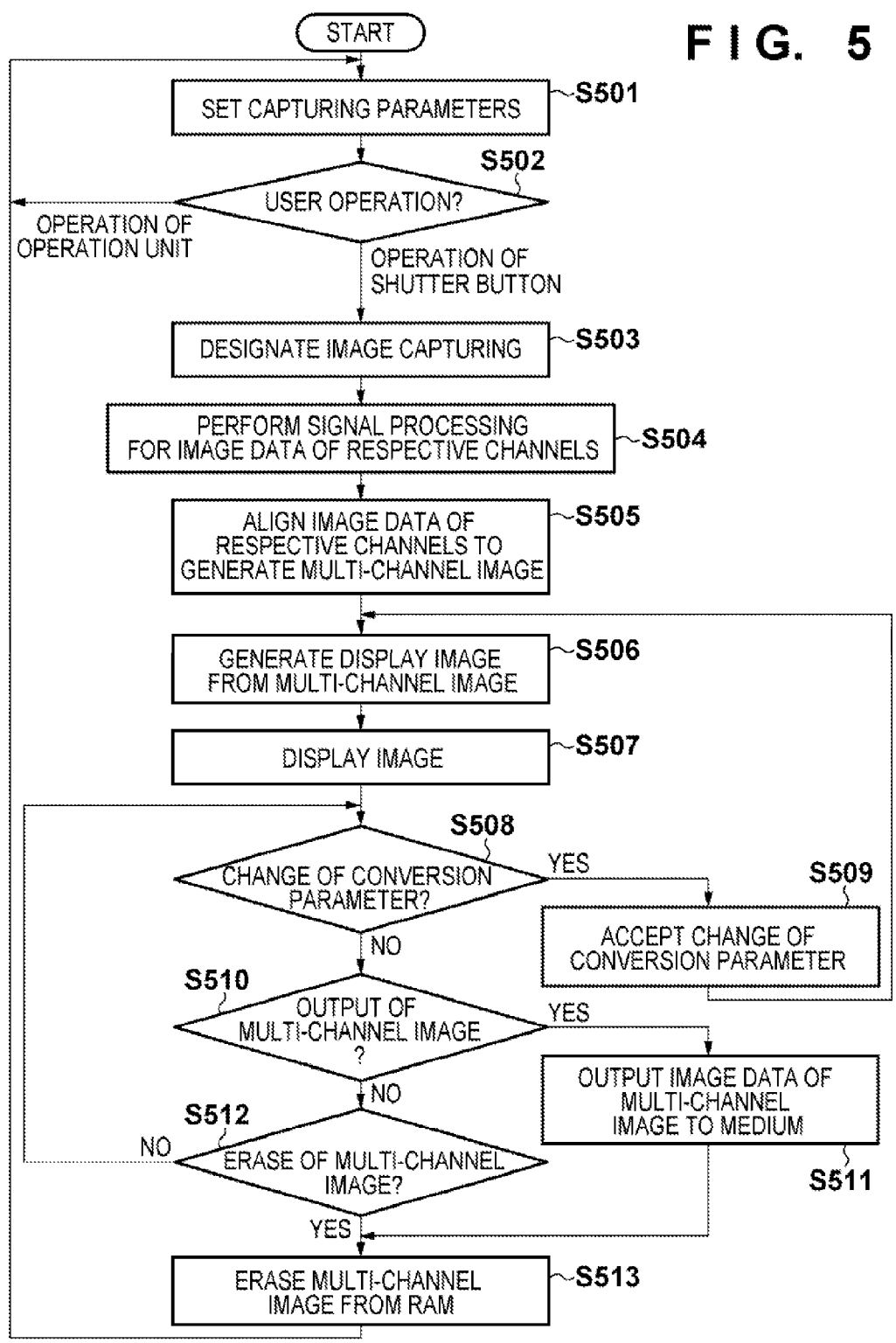
FIG. 5 is a flowchart for explaining image capturing processing by the image capturing apparatus according to the embodiment.

Image capturing processing by the image capturing apparatus according to the embodiment will be described with reference to the flowchart of FIG. 5.

The CPU 412 controls the capturing units 401 to 409 in accordance with a user instruction, and sets capturing parameters such as the focal length, f-number, and exposure time (step S501). Then, the CPU 412 determines a user operation (step S502). If the user has operated the operation unit 304, the CPU 412 returns the process to step S501. If the user has pressed the shutter button 302, the CPU 412 instructs the capturing units 401 to 409 to capture an image (step S503).

After the end of capturing, the CPU 412 sequentially reads out image data from the buffer memories of the capturing units 401 to 409. The CPU 412 controls the digital signal processor 419 to perform signal processing for the readout image data, and stores, in the RAM 411, the image data having undergone the signal processing (step S504).

The CPU 412 reads out image data of the respective channel images stored in the RAM 411. The CPU 412 controls the image generator 420 to generate a multi-channel image by aligning the readout image data of the respective channel images. The CPU 412 stores the image data of the generated multi-channel image in the RAM 411 (step S505). After storing the image data of the multi-channel image, the CPU 412 deletes the image data of the respective channels from the RAM 411.

The CPU 412 reads out the image data of the multi-channel image stored in the RAM 411. The CPU 412 controls the display image generator 421 to generate a display image by performing display image generation processing for the readout image data of the multi-channel image (step S506). The CPU 412 supplies the image data of the generated display image to the display controller 413 to display the image on the monitor 303 (step S507).

The CPU 412 determines a user instruction. The user observes the image displayed on the monitor 303, and operates the operation unit 304 to designate change of the conversion parameter, output or erase of the multi-channel image, or the like.

If the user designates change of the conversion parameter (YES in step S508), the CPU 412 displays a conversion parameter change UI on the monitor 303, and accepts change of the conversion parameter (step S509). After the end of change, the CPU 412 returns the process to step S506. Note that the monitor 303 can simultaneously display the image and conversion parameter change UI, and display an image converted in accordance with a changed conversion parameter.

If the user designates output of the multi-channel image (YES in step S510), the CPU 412 outputs the image data of the multi-channel image stored in the RAM 411 to the medium 417 or the like via the I/F 416 (step S511). After that, the CPU 412 erases the image data of the multi-channel image from the RAM 411 (step S513).

If the image displayed on the monitor 303 is not the expected one such that the object is not full, the image is out of focus, overexposure or underexposure has occurred, or no desired tone can be obtained even by adjusting the conversion parameter, the user designates erase of the multi-channel image (step S512). In this case, the CPU 412 erases the image data of the multi-channel image from the RAM 411 (step S513).

After erasing the image data of the multi-channel image, the CPU 412 returns the process to step S501. When outputting the image data of the multi-channel image, image data of the display image and the conversion parameter can also be output in addition to the image data of the multi-channel image under preset output conditions.

[Capturing Unit]

Figures 6, 7:
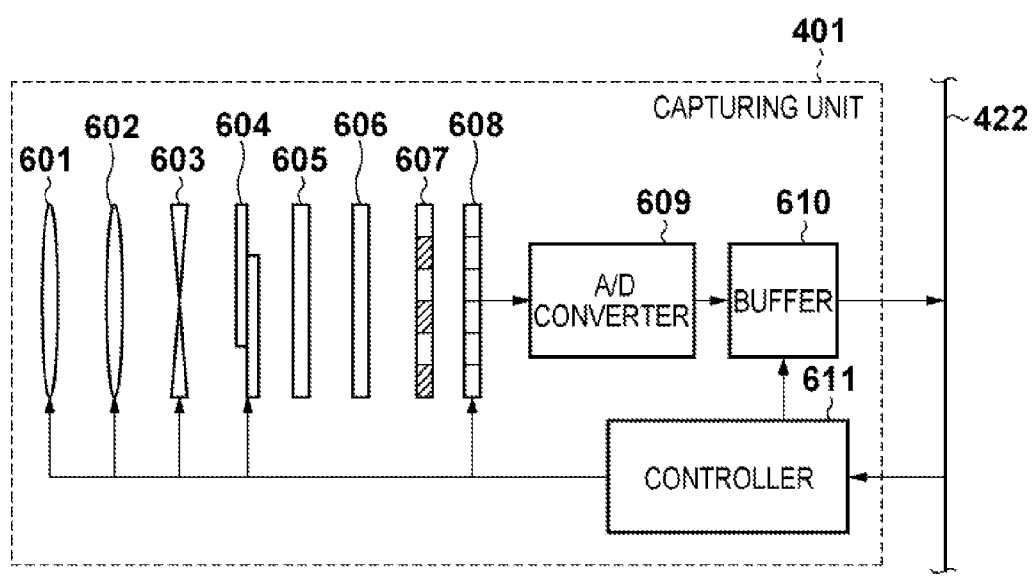
FIG. 6 is a block diagram for explaining the arrangement of a capturing unit.
FIG. 7 is a view for explaining the arrangement of a filter.

The arrangement of the capturing units 401 to 409 will be explained with reference to the block diagram of FIG. 6. FIG. 6 shows the arrangement of the capturing unit 401, and the remaining capturing units 402 to 408 also have the same arrangement.

Light traveling from the object passes through a zoom lens 601, focus lens 602, diaphragm 603, shutter 604, optical low-pass filter 605, infrared cut filter 606, and filter 607, and forms an image on a capturing device 608 such as a CMOS sensor or charge coupled device (CCD). An analog-to-digital converter (A/D converter) 609 A/D-converts a signal output from the capturing device 608. A buffer 610 temporarily stores digital data output from the A/D converter 609.

A controller 611 controls the zoom lens 601, focus lens 602, and diaphragm 603 to set the zoom, focal length, and f-number in accordance with capturing parameters supplied from the CPU 412. Also, the controller 611 controls the shutter 604 and capturing device 608 to capture an image in accordance with an instruction from the CPU 412. In response to a request from the CPU 412, the controller 611 transfers the digital data stored in the buffer memory to the RAM 411 via the system bus 422.

The arrangement of the filter 607 will be explained with reference to FIG. 7. FIG. 7 shows respective cells of the filter 607 that correspond to respective capturing elements of the capturing device 608. A Y cell is a luminance capturing filter, and is implemented by arranging a transparent filter or no filter. The Y cells have common characteristics in the capturing units 401 to 409. A combination of the Y cell and capturing element corresponds to the "common element".

A Cn cell is a color information capturing filter, and has a controlled wavelength transmission characteristic. That is, the Cn cell is a capturing filter for a specific wavelength. The respective capturing units include Cn cells different in transmission wavelength characteristic in, for example, the visible range. A combination of the Cn cell and capturing element corresponds to the "specific element". Instead of using filters different in transmission wavelength characteristic in the respective capturing units, a capturing device capable of dynamically controlling the spectral sensitivity characteristics of the respective capturing elements may be used to acquire optical information of different wavelengths in the capturing units 401 to 409.

The capturing units 401 to 409 are equal in the number of pixels. A pixel corresponding to a common element on an image will be called an "alignment pixel", and a pixel corresponding to a specific element will be called a "color pixel".

[Image Generator]

Figure 8:
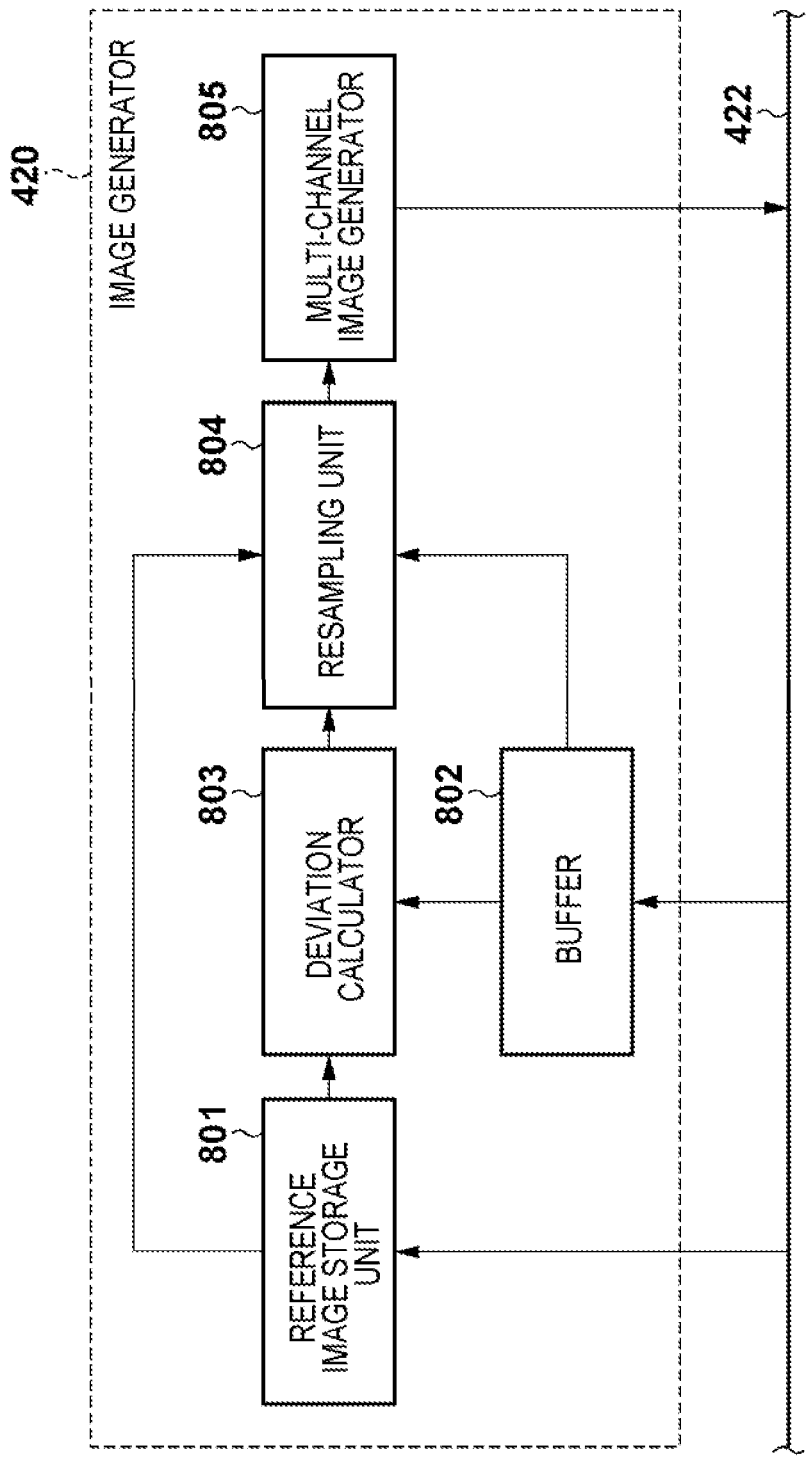
FIG. 8 is a block diagram for explaining the arrangement of an image generator.

The arrangement of the image generator 420 will be explained with reference to the block diagram of FIG. 8.

A reference image storage unit 801 receives image data of a reference image via the system bus 422, and holds it. Although the reference image is an image acquired by an arbitrary capturing unit, an image acquired by the capturing unit 401 will be described as the reference image. A buffer 802 receives image data of an image (to be referred to as an alignment image) other than the reference image via the system bus 422, and holds it. The image data held in the reference image storage unit 801 and buffer 802 can be divided into alignment pixels and color pixels.

A deviation calculator 803 compares an image represented by the alignment pixels of the reference image with an image represented by those of the alignment image, and calculates a deviation amount indicating a position deviation from the reference image to the alignment image.

A resampling unit 804 resamples the color pixels of the alignment image based on the deviation amount so that the color pixels of the alignment image overlap those of the reference image. The resampling unit 804 then outputs, to a multi-channel image generator 805, image data of one channel obtained by interpolating the color pixels of the alignment image. As for the reference image, the resampling unit 804 outputs image data of one channel obtained by simply interpolating color pixels.

The multi-channel image generator 805 receives the image data output from the resampling unit 804, and holds it as image data of one channel without any processing. After the end of resampling the color pixels of the respective channels, the multi-channel image generator 805 integrates the held images of the respective channels into one data and outputs, to the system bus 422, the data as a multi-channel image in which the position deviation between the images of the respective channels has been corrected. In the embodiment, the Cn cells of the capturing units 401 to 409 are different in transmission wavelength characteristic, so the multi-channel image is a multi-band image of nine bands.

Figure 9:
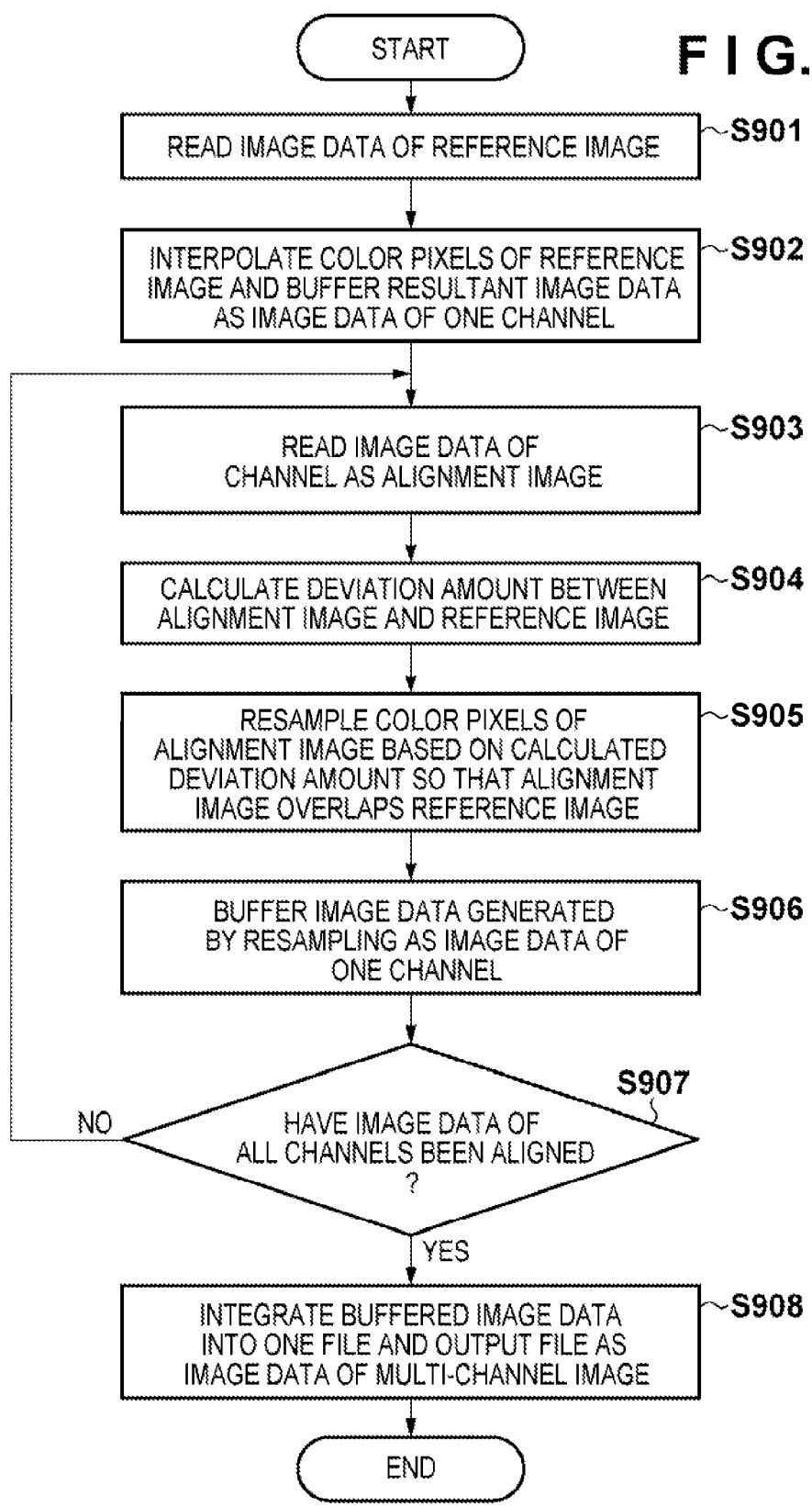
FIG. 9 is a flowchart for explaining processing by the image generator.

Processing by the image generator 420 will be described with reference to the flowchart of FIG. 9. The processing shown in FIG. 9 corresponds to processing (step S505) to be executed in accordance with an instruction from the CPU 412.

The image generator 420 receives image data of a reference image (step S901). Since the alignment image is deformed to overlap the reference image, the viewpoint of a capturing unit which has captured the reference image serves as the viewpoint of the multi-channel image. Then, the image generator 420 interpolates the color pixels of the reference image, and buffers the resultant image data as image data of one channel (step S902).

The arrangement of color pixels will be explained with reference to FIG. 10. Color pixels corresponding to Cn cells are extracted, obtaining an image in which the pixel I(m,n) of the capturing device 608 alternately exists and does not exist in the X and Y directions, as shown in FIG. 10. A position where a pixel exists is given by m+n=2λ, λ∈N. A pixel value at a position m+n≠2λ, λ∈N is calculated by interpolation processing. The position m+n=2λ, λ∈N exists on a square lattice rotated through 45°, and the position m+n≠2λ, λ∈N exists at the center of the lattice. Hence, a pixel can be interpolated by linear interpolation given by conditional expression (1):

if $(m+n=2\lambda, \lambda \in N)$ $I'(m,n)=I(m,n);$ if $(m+n \neq 2\lambda, \lambda \in N)$ $$I'(m,n)=\{I(m-1,n)+I(m+1,n)+I(m,n-1)+I(m,n+1)\}/4; \quad (1)$$

Although conditional expression (1) represents bilinear interpolation processing, interpolation processing may be done by another method such as a bicubic method.

Thereafter, the image generator 420 receives, as an alignment image, unaligned image data of a channel (step S903), and calculates the deviation amount between the alignment image and the reference image (step S904), details of which will be described later. The image generator 420 resamples the color pixels of the alignment image based on the calculated deviation amount so that the alignment image overlaps the reference image (step S905), and buffers image data generated by resampling as image data of one channel (step S906), details of which will be described later.

The image generator 420 determines whether image data of all the channels have been aligned (step S907). If unaligned image data of a channel remains, the image generator 420 returns the process to step S903. If image data of all the channels have been aligned, the image generator 420 integrates the buffered image data into one file, and outputs the file as image data of a multi-channel image (step S908).

[Calculation of Deviation Amount]

As represented as blank cells in FIG. 10, the alignment pixel alternately exists and does not exist in the X and Y directions, similar to the color pixel. For alignment, the array of alignment pixels is rotated through 45° and regarded as the array of a normal square lattice. Equation (2) is a matrix for performing coordinate transformation:

$$M = \begin{bmatrix} 1/2 & 1/2 \\ -1/2 & 1/2 \end{bmatrix} \quad (2)$$

Letting (m,n) be original coordinates and (h,k) be transformed coordinates, the coordinate transformation is given by equation (3):

$$\begin{bmatrix} h \\ k \end{bmatrix} = M \begin{bmatrix} m \\ n \end{bmatrix} \quad (3)$$

By coordinate transformation, the alignment pixels can be transformed into pixels arrayed on a normal square lattice. The deviation amount can therefore be calculated using an existing alignment method.

Figure 11:
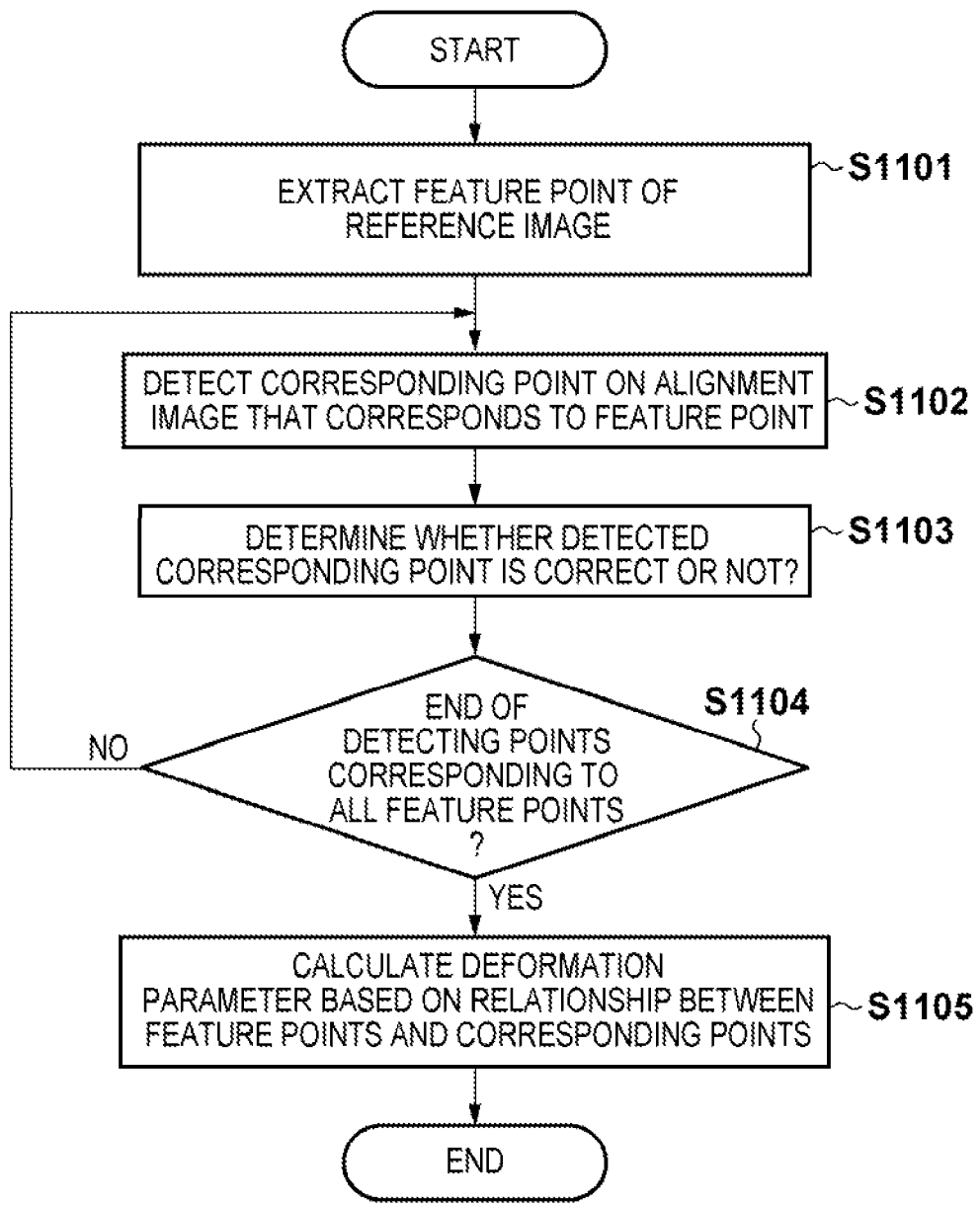
FIG. 11 is a flowchart for explaining a method of calculating the position deviation amount between images.

A method of calculating the deviation amount between images will be explained with reference to the flowchart of FIG. 11. A method of extracting a feature point of a reference image, obtaining a point (to be referred to as a corresponding point) on the alignment image that corresponds to the feature point, and obtaining the deviation amount of the whole image as a deformation parameter will be described.

The deviation calculator 803 extracts a feature point of the reference image (step S1101), and detects a corresponding point on the alignment image that corresponds to the feature point (step S1102).

Extraction of a feature point uses, for example, Harris corner detection described in C. Harris and M. Stephens, "A combined corner and edge detector", Proceedings of the 4$^{th}$ Alvey Vision Conference, pp. 147-151, 1988. Detection of a corresponding point uses, for example, a block matching method. More specifically, a block centered on a feature point is set on the reference image, and the evaluation value is calculated while gradually shifting the relative position of the reference image and alignment image. The evaluation value employs the sum of absolute difference values or the square sum of differences between the pixel values of the reference image and those of the alignment image within the block. The center of the block in the alignment image when the minimum evaluation value was obtained is detected as a corresponding point. The corresponding point can be detected at high precision by fitting the relationship between the relative position and the evaluation value based on the absolute value of a linear function or a quadratic function, and obtaining a corresponding point from a relative position where the evaluation value becomes minimum on the function.

The deviation amount calculation method based on the pixel value is premised on that the pixel value at the same point on the object within an image is almost equal between images. Hence, no high precision can be obtained when the deviation amount is calculated between cameras having different characteristics. According to the embodiment, however, the deviation amount is calculated from images of the alignment pixels having the same characteristics, so the above-mentioned premise is established, maintaining high precision.

Thereafter, the deviation calculator 803 determines whether the detected corresponding point is correct (step S1103). At this time, it suffices to determine, for example, whether the minimum evaluation value calculated in step S1102 is equal to or smaller than a predetermined threshold. If the minimum evaluation value is equal to or smaller than the threshold, it is determined that a correct corresponding point has been detected; if the minimum evaluation value exceeds the threshold, it is determined that an erroneous corresponding point has been detected. A feature point for which an erroneous corresponding point has been detected is not used in subsequent processing.

The deviation calculator 803 determines whether points corresponding to all feature points have been detected (step S1104). If NO in step S1104, the deviation calculator 803 returns the process to step S1102. If points corresponding to all feature points have been detected, the deviation calculator 803 calculates the deformation parameter based on the relationship between the feature point and the corresponding point (step S1105).

In the following example, the position deviation amount is described by the affine parameter. The relationship between the feature point and the corresponding point can be given by equation (4):

$$\begin{bmatrix} h' \\ k' \\ 1 \end{bmatrix} = \begin{bmatrix} a & b & c \\ d & e & f \\ 0 & 0 & 1 \end{bmatrix} \begin{bmatrix} h \\ k \\ 1 \end{bmatrix} \quad (4)$$

where (h,k): the position of the feature point (h',k'): the position of the corresponding point In equation (4), the 3×3 matrix is the affine transformation matrix. Each element of the matrix is an affine parameter. For a=1, b=0, d=0, and e=1, transformation is translation in which c indicates the horizontal moving amount and f indicates the vertical moving amount. Rotational movement at the rotation angle θ can be given by a=cos θ, b=−sin θ, d=sin θ, and e=cos θ. By using a generalized matrix form, equation (4) can be rewritten into equation (5):

$$x'=Ax \quad (5)$$

where x, x': 1×3 matrix
A: 3×3 matrix

When the number of feature points for which correct corresponding points have been obtained is n, the coordinate values of the feature points can be expressed by an 3×n matrix as represented by equation (6):

$$X=(x1\,x2\,\ldots\,xn) \quad (6)$$

Similarly, even corresponding points can be expressed by an n×3 matrix as represented by equation (7):

$$X'=(x1'\,x2'\,\ldots\,xn') \quad (7)$$

From this, n motion vectors are given by equation (8):

$$X'=AX \quad (8)$$

In other words, the affine matrix A in equation (8) is obtained as the position deviation amount of the overall alignment image. Deforming equation (8) yields equation (9) representing the affine matrix A:

$$A=X'X^T(XX^T)^{-1} \quad (9)$$

where T: transposed matrix

According to this method, the motion amount is expressed as the affine transformation parameter.

The coordinate transformation and affine transformation for the alignment image can be summarized by equation (10):

$$\begin{bmatrix} m' \\ n' \\ 1 \end{bmatrix} = \begin{bmatrix} M & 0 \\ 0 & 1 \end{bmatrix}^{-1} A \begin{bmatrix} M & 0 \\ 0 & 1 \end{bmatrix} \begin{bmatrix} m \\ n \\ 1 \end{bmatrix} \quad (10)$$

Based on equation (10), the coordinate deviation indicating the position deviation amount can be calculated.

[Resampling]

The resampling unit 804 resamples the color pixels of the alignment image based on the position deviation amount calculated in accordance with equation (10). The color pixels exist only in half the alignment image. Thus, applying the coordinate transformation as represented by equation (3) to the both sides of equation (10) yields equation (11):

$$\begin{bmatrix} h' \\ k' \\ 1 \end{bmatrix} = A \begin{bmatrix} M & 0 \\ 0 & 1 \end{bmatrix} \begin{bmatrix} m \\ n \\ 1 \end{bmatrix} \quad (11)$$

where (h',k'): the transformed coordinates of the alignment image

The transformed coordinates (h',k') indicate a position on the square lattice. Therefore, the position of a color pixel on the alignment image is obtained according to equation (11). The value of a color pixel at a position where no color pixel exists is obtained by an interpolation method such as a bilinear method or bicubic method. Then, resampling is executed.

In this way, the capturing device of each capturing unit in the multi-eye camera includes specific and common elements. Images of the respective channels are aligned based on images obtained by common elements having the same characteristics. Images of the respective channels can be aligned at high accuracy.

Modification of Embodiment

In the above example, the multi-eye camera includes nine capturing units arrayed in the matrix. However, it suffices to arrange at least two capturing units to capture a multi-band image, and the embodiment is not limited by the number and arrangement of capturing units.

A plurality of capturing units may include a plurality of capturing units having capturing elements of the same specific capturing characteristics, in other words, having the same capturing characteristics. For example, the capturing units may include the second capturing unit for red R and luminance Y, in addition to three capturing units for red R and luminance Y, for green G and luminance Y, and for blue B and luminance Y.

In the above example, specific and common elements are alternately arranged in the square lattice. However, it suffices to calculate the deviation amount and perform interpolation processing in accordance with the number and arrangement of elements (color pixels and alignment pixels). The embodiment is not limited by the number and arrangement of elements (color pixels and alignment pixels).

In the above description, the alignment pixel represents luminance information. However, the alignment pixel may represent arbitrary color information. The embodiment is not limited by the arrangement and characteristics of the alignment pixel.

In the above example, the deviation amount is calculated using Harris corner detection, block matching, and affine parameter calculation. However, the method is arbitrary as long as the deviation amount is calculated using the alignment pixels.

In the above example, the color pixels are resampled (interpolated) by the bilinear or bicubic method. However, the interpolation processing method is arbitrary.

Second Embodiment

An image capturing apparatus according to the second embodiment of the present invention will be described. In the second embodiment, the same reference numerals as those in the first embodiment denote the same parts, and a detailed description thereof will not be repeated.

The second embodiment will describe an example of acquiring images to undergo high dynamic range composition using a multi-eye camera. The second embodiment is different from the first embodiment in the arrangement of a filter 607 of each of capturing units 401 to 409. The arrangement of the filter 607 according to the second embodiment will be described with reference to FIG. 12.

Similar to the first embodiment, a Y cell is a luminance capturing filter, and is implemented by arranging a transparent filter or no filter. The Y cells have common characteristics in the capturing units 401 to 409. A combination of the Y cell and capturing element corresponds to the "common element".

Rn is a color filter for transmitting the R component, Gn is a color filter for transmitting the G component, and Bn is a color filter for transmitting the B component. The respective capturing units include Rn, Gn, and Bn cells different in transmittance. A combination of the color filer and capturing element corresponds to the "specific element". The respective capturing units acquire images captured with different sensitivity characteristics. Instead of using color filters different in transmittance in the respective capturing units, the sensitivity characteristics of the respective capturing units may be dynamically controlled to acquire color information with different sensitivity characteristics in the capturing units 401 to 409. As a method of controlling the sensitivity characteristic for each capturing unit, for example, the exposure time is changed for each capturing unit.

The second embodiment is also different from the first embodiment in the image generation method, alignment method, and resampling method. FIG. 13 shows the array of alignment pixels according to the second embodiment. In the second embodiment, the number of alignment pixels is a value obtained by thinning out all pixels at ½ vertically and horizontally.

In color pixel interpolation (steps S902 and S905), for example, the G and B components of a pixel (to be referred to as an Rn pixel) corresponding to an Rn cell are interpolated from surrounding Gn and Bn pixels. This also applies to the other color components of the Gn and Bn pixels. The R, G, and B components of a pixel (to be referred to as a Y pixel) corresponding to a Y cell are interpolated from surrounding pixels after the end of interpolating the R, G, and B components of eight pixels (to be referred to as surrounding pixels) surrounding the Y pixel.

Calculation of the position deviation amount uses equation (12) in place of equation (2):

$$M = \begin{bmatrix} 1/2 & 0 \\ 0 & 1/2 \end{bmatrix} \qquad (12)$$

Similarly, even resampling employs equation (12).

Further, the second embodiment is different from the first embodiment in display image generation processing. To acquire a multi-channel image used for high dynamic range composition, high dynamic range composition is executed using the method described in literature 1 or the like when generating a display image.

As described above, the capturing device of each capturing unit in the multi-eye camera includes specific and common elements. Images of the respective channels are aligned based on images obtained by common elements having the same characteristics. Similar to the first embodiment, images of the respective channels can be aligned at high accuracy.

Modification of Embodiment

In the above example, one capturing unit includes one type of common element and three types of specific elements. However, the respective color components may be shot using different capturing units. The embodiment is not limited by the number of types of specific elements.

In the above description, the alignment pixel represents luminance information. However, the alignment pixel may represent arbitrary color information. The embodiment is not limited by the arrangement and characteristics of the alignment pixel.

Third Embodiment

An image capturing apparatus according to the third embodiment of the present invention will be described. In the third embodiment, the same reference numerals as those in the first and second embodiments denote the same parts, and a detailed description thereof will not be repeated.

In the first and second embodiments, all the capturing units include common elements. The third embodiment prepares capturing elements having characteristics common between two capturing units. More specifically, the third embodiment will explain a method of performing alignment processing between all capturing units having an arrangement in which a capturing element X is common to capturing units A and B, and a capturing element Y is common to capturing units B and C. The arrangement of a filter 607 according to the third embodiment will be described with reference to FIG. 14. Each of the capturing units includes capturing elements having capturing characteristics common to this capturing unit and another capturing unit, and capturing elements having capturing characteristics common to this capturing unit and still another capturing unit.

There are 10 types of Cn cells C1 to C10 serving as color information capturing filters. On the filter 607 of the nth capturing unit, Cn cells and Cm cells (for example, Cn+1 and Cn−1 cells) different in characteristics from the Cn cells are arrayed alternately. Note that the Cn cells may be filters having different transmission wavelengths to acquire a multi-band image, or filters of the R, G, and B color components having different transmittances to acquire a high dynamic range image. Instead of filters of the R, G, and B color components having different transmittances, filters of the R, G, and B color components having the same transmittance, and neutral density (ND) filters having different transmittances may be combined.

Figure 15:
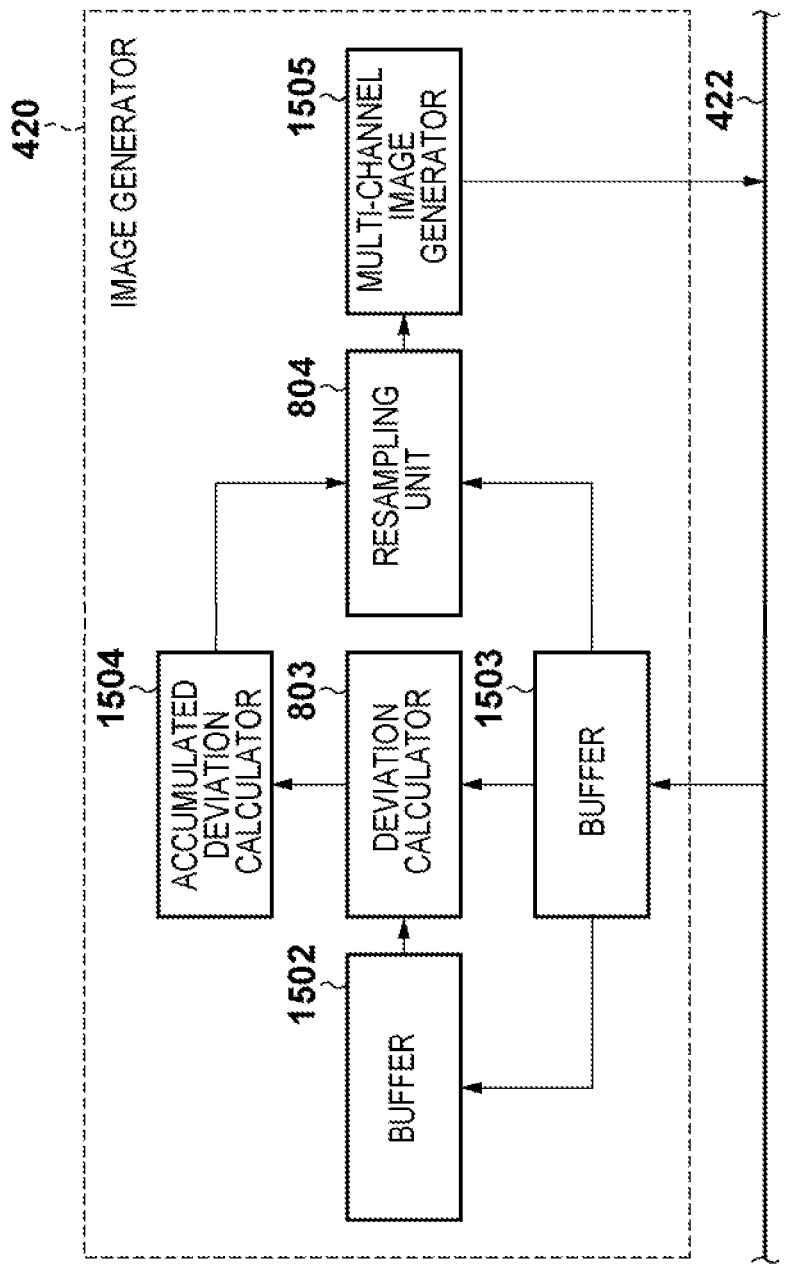
FIG. 15 is a block diagram for explaining the arrangement of an image generator according to the third embodiment.

The arrangement of an image generator 420 according to the third embodiment will be explained with reference to FIG. 15. $I_1$ to $I_9$ are images captured by capturing units 401 to 409, and $T_{nn+1}$ represents coordinate transformation from a coordinate of the image $I_n$ to a coordinate of the image $I_{n+1}$.

A buffer 1503 receives image data via a system bus 422, and holds it. The first input image data can be image data acquired by an arbitrary capturing unit. In this case, image data of an image $I_1$ (reference image in the third embodiment) is input.

A resampling unit 804 resamples (interpolates) two types of pixels of the image data held in the buffer 1503, and outputs image data of two channels. A multi-channel image generator 1505 holds the image data of two channels output from the resampling unit 804.

After the end of processing by the resampling unit 804, the buffer 1503 transfers the held image data of the image $I_1$ to a buffer 1502, receives image data of an image $I_2$ via the system bus 422, and holds it.

A deviation calculator 803 calculates the position deviation amount $T_{12}$ between the image $I_1$ held in the buffer 1502 and the image $I_2$ held in the buffer 1503. At this time, the deviation calculator 803 calculates the position deviation amount $T_{12}$ by using the values of pixels corresponding to filters common to the capturing unit 401 which has acquired the image $I_1$ and the capturing unit 402 which has acquired the image $I_2$. For example, when the capturing unit 401 includes the filters C1 and C2 and the capturing unit 402 includes the filters C2 and C3, the position deviation amount $T_{12}$ is calculated using the values of pixels corresponding to the filters C2.

An accumulated deviation calculator 1504 stores the deviation amount $T_{12}$ output from the deviation calculator 803 as the accumulated deviation amount. The resampling unit 804 resamples two types of pixels on the image data held in the buffer 1503 based on the accumulated deviation amount output from the accumulated deviation calculator 1504, and outputs image data of two channels. The multi-channel image generator 1505 holds the image data of two channels output from the resampling unit 804.

After the end of processing by the resampling unit 804, the buffer 1503 transfers the held image data of the image $I_2$ to the buffer 1502 again, receives image data of an image $I_3$ via the system bus 422, and holds it. By the same processing, the deviation calculator 803 calculates the deviation amount $T_{23}$.

The accumulated deviation calculator 1504 receives the deviation amount $T_{23}$ from the deviation calculator 803, stores it, and calculates and stores the combined deviation amount (combined function) $T_{23}T_{12}$ as the accumulated deviation amount $T_{13}$. The resampling unit 804 resamples two types of pixels on the image data held in the buffer 1503 based on the accumulated deviation amount $T_{13}$ output from the accumulated deviation calculator 1504, and outputs image data of two channels. The multi-channel image generator 1505 holds the image data of two channels output from the resampling unit 804.

The same processing is repeated up to image data of an image $I_9$, and resampling is executed so that the images $I_2$ to $I_9$ overlap the image $I_1$. After the end of resampling all the images, the multi-channel image generator 1505 averages these two image data to hold every two of image data corresponding to the filters C2 to C9 other than the filters C1 and C10. The multi-channel image generator 1505 integrates image data corresponding to the filters C1 to C10 into one file by using the averaged image data as part of a multi-channel image, and outputs the file as the multi-channel image to the system bus 422.

Processing by the image generator 420 will be described with reference to the flowchart of FIG. 16. The processing shown in FIG. 16 corresponds to processing (step S505) to be executed in accordance with an instruction from a CPU 412.

The image generator 420 reads image data of the image $I_1$ (step S1601), interpolates two types of pixels of the image $I_1$, and buffers the resultant image data as image data of two channels (step S1602).

The image generator 420 sets image data of the image $I_n$ (in this case, image $I_1$) as a reference image (step S1603), and receives image data of the image $I_{n+1}$ (in this case, image $I_2$) (step S1604). The image generator 420 calculates the position deviation amount $T_{nn+1}$ between the images $I_n$ and $I_{n+1}$ by using the pixel values of capturing elements common to the images $I_n$ and $I_{n+1}$ (step S1605).

The image generator 420 calculates the accumulated position deviation $T_{1n+1}$ from the image $I_1$ to the image $I_{n+1}$ in accordance with equation (13) and holds it (step S1606):

$$T_{1n+1} = T_{nn+1} \cdot T_{1n} \quad (13)$$

Note that equation (13) represents the product of the matrices $T_{nn+1}$ and $T_{1n}$, and when $T_{1n}$ is not held because of the first processing in repetition, processing is executed by regarding $T_{1n}$ as identity mapping.

Then, the image generator 420 interpolates two types of pixels of the image $I_{n+1}$ based on the accumulated position deviation amount $T_{1n+1}$ so that the image $I_{n+1}$ overlaps the image $I_1$, and buffers the resultant image data as image data of two channels (step S1607).

The image generator 420 determines whether the processes in steps S1604 to S1607 have been executed for the images $I_2$ to $I_9$ (step S1608). If NO in step S1608, the image generator 420 returns the process to step S1604. If the processes in steps S1604 to S1607 have ended for the images $I_2$ to $I_9$, the image generator 420 averages two image data corresponding to the filters C2 to C9 other than the filters C1 and C10 (step S1609). The image generator 420 integrates image data corresponding to the filters C1 to C10 into one file, and outputs the file as a multi-channel image to the system bus 422 (step S1610).

In this fashion, the capturing devices of the respective capturing units in the multi-eye camera include common capturing elements, and images of the respective channels are aligned based on images obtained by the common capturing elements. Images of the respective channels can be aligned at high accuracy. By averaging image data superimposed using the common capturing elements without using capturing elements dedicated to only alignment, a multi-channel image can be generated by high-accuracy alignment at high SN ratio.

Modification of Embodiments

The capturing units 401 to 409 can also be configured by setting the filter C1=C10. The image generator 420 repeats processing of calculating, from image data acquired by capturing units having common capturing characteristics, the deviation amount between images of image data acquired by two capturing units including capturing elements having common capturing characteristics. By accumulating the calculated deviation amounts, the deviation amount of an image of image data acquired by another capturing unit is calculated with respect to the reference image of image data acquired by one capturing unit.

In this case, the number of channel images corresponding to wavelengths or the number of channel images corresponding to sensitivity ranges decreases by one. However, image data corresponding to the filters C1 and C10 can be averaged to increase the SN ratio corresponding to all wavelengths or all sensitivity ranges.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-062928, filed Mar. 22, 2011, which is hereby incorporated by reference herein in its entirety.

What is claimed is:

1. An image capturing apparatus comprising:
a first image capturing unit having a first image sensor and configured to obtain first image data by capturing a subject using a first group of pixels, of the first image sensor, having a first capturing characteristic;
a second image capturing unit having a second image sensor, for capturing the subject from a viewpoint different from the first image capturing unit, and configured to obtain second image data by capturing the subject using a second group of pixels, of the second image sensor, having a second capturing characteristic different from the first capturing characteristic;
a calculator configured to calculate a deviation amount indicating a position deviation between the first image data and the second image data; and
a combination unit, configured to combine the first image data and the second image data by aligning the first image data and the second image data using the deviation amount,
wherein the first image sensor further comprises a third group of pixels having a capturing characteristic common to a group of pixels included in the second image sensor, and
wherein the calculator calculates the deviation amount based on a correspondence between an image represented by the third group of pixels and an image represented by the pixels of the second image sensor having the common capturing characteristic to the third group of pixels.

2. The apparatus according to claim 1, wherein the combination unit combines the first image data and the second image data to generate image data indicating a multi-channel image having information of both the first image data and the second image data.

3. The apparatus according to claim 1, wherein the first group of pixels corresponds to filters having wavelength transmission characteristics different from filters corresponding to the second group of pixels.

4. The apparatus according to claim 1, wherein the first group of pixels have a sensitivity characteristic to light different from a sensitivity characteristic to light of the second group of pixels.

5. An image capturing apparatus comprising:
a plurality of capturing sections which acquire, from an object, image data having characteristics different from each other;
a calculator, configured to calculate a deviation amount indicating a position deviation between images represented by the image data acquired by the plurality of capturing sections; and
a generator, configured to generate image data of a multi-channel image in which the position deviation between the images represented by the image data acquired by the plurality of capturing sections has been corrected using the deviation amount,
wherein each of the plurality of capturing sections comprises a capturing element having capturing characteristics common to the capturing section and another capturing section, and comprises a capturing element having capturing characteristics common to the capturing section and still another capturing section, and
wherein the calculator repeats processing of calculating, from image data acquired by capturing elements having the common capturing characteristics, a deviation amount between images represented by image data acquired by two capturing sections comprising capturing elements having the common capturing characteristics, and accumulates the deviation amount, thereby calculating the deviation amount of an image of image data acquired by another capturing section with respect to a reference image of image data acquired by one capturing section.

6. The apparatus according to claim 5, wherein the generator averages two image data acquired by the capturing elements having the common capturing characteristics, and generates the averaged image data as the image data of the multi-channel image.

7. The apparatus according to claim 5, wherein the plurality of capturing sections acquire image data for light components having wavelengths different from each other.

8. The apparatus according to claim 5, wherein the plurality of capturing sections acquire image data having light sensitivity characteristics different from each other.

9. An image processing apparatus comprising:
an input unit configured to input first image data and second image data, wherein the first image data is obtained by capturing a subject using a first image sensor comprising a first group of pixels having a first capturing characteristic and the second image data is obtained by capturing the subject from a viewpoint different from the first image capturing unit using a second image sensor comprising a second group of pixels having a second capturing characteristic different from the first capturing characteristic;

a calculator, configured to calculate a deviation amount indicating a position deviation between the first image data and the second image data; and a combination unit, configured to combine the first image data and the second image data by aligning the first image data and the second image data using the deviation amount, wherein the first image sensor further comprises a third group of pixels having a capturing characteristic common to a plurality of pixels included in the second image sensor, and wherein the calculator calculates the deviation amount based on a correspondence between an image represented by the third group of pixels and an image represented by the pixels of the second image sensor having the common capturing characteristic to the third group of pixels.

* * * * *